US012671980B2

(12) United States Patent (10) Patent No.: US 12,671,980 B2
Hong (45) Date of Patent: Jun. 30, 2026

(54) INFORMATION TRANSMISSION METHODS AND APPARATUSES, AND COMMUNICATION DEVICES AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 604 days.

(21) Appl. No.: 18/007,946

(22) PCT Filed: Jun. 3, 2020

(86) PCT No.: PCT/CN2020/094245
§ 371 (c)(1),
(2) Date: Dec. 2, 2022

(87) PCT Pub. No.: WO2021/243619
PCT Pub. Date: Dec. 9, 2021

(65) Prior Publication Data
US 2023/0232213 A1 Jul. 20, 2023

(51) Int. Cl.
*H04W 8/00* (2009.01)
*H04W 8/22* (2009.01)
*H04W 76/20* (2018.01)
(52) U.S. Cl.
CPC ............. *H04W 8/22* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 9,302,393 | B1 * | 4/2016 | Rosen | .................... G06N 3/008 |
| 11,886,991 | B2 * | 1/2024 | Wang | .................... H04L 12/189 |
| 2017/0048681 | A1 * | 2/2017 | Gupta | ................ H04N 21/6587 |
| 2017/0245115 | A1 * | 8/2017 | Lei | .......................... H04W 4/90 |
| 2018/0368134 | A1 | 12/2018 | Zhang et al. | |
| 2020/0100327 | A1 | 3/2020 | Zhang et al. | |
| 2021/0160149 | A1 * | 5/2021 | Ma | ........................ H04W 72/20 |

FOREIGN PATENT DOCUMENTS

| | | |
|---|---|---|
| CN | 105636087 A | 6/2016 |
| CN | 106899656 A | 6/2017 |
| CN | 108243245 A | 7/2018 |
| CN | 108647085 A | 10/2018 |
| CN | 109769207 A | 5/2019 |

(Continued)

OTHER PUBLICATIONS

SA State Intellectual Property Office of the People's Republic of China, International Search Report Issued in Application No. PCT/CN2020/094245, Feb. 20, 2021, WIPO, 5 pages.

(Continued)

*Primary Examiner* — Gerald A Smarth
(74) *Attorney, Agent, or Firm* — Volpe Koenig

(57) ABSTRACT
Information transmission methods, apparatuses, communication devices and non-transitory computer readable storage medium that enable a user equipment (UE) to report artificial intelligence (AI) capability information indicating an AI capability of the UE to a base station.

16 Claims, 5 Drawing Sheets

(56) References Cited

FOREIGN PATENT DOCUMENTS

| | | | | | |
|---|---|---|---|---|---|
| CN | 110475243 | A | | 11/2019 | |
| CN | 110495196 | A | | 11/2019 | |
| CN | 110601935 | A | | 12/2019 | |
| CN | 110730954 | A | | 1/2020 | |
| CN | 110785984 | A | | 2/2020 | |
| CN | 111062470 | A | | 4/2020 | |
| CN | 112529026 | A | * | 3/2021 | ............. G06N 3/091 |
| WO | WO-2019019895 | A1 | * | 1/2019 | ............. H04W 8/24 |
| WO | WO-2020009321 | A1 | * | 1/2020 | ........... H04W 72/23 |

OTHER PUBLICATIONS

State Intellectual Property Office of the People's Republic of China, Office Action and Search Report Issued in Application No. 2020800011546, Sep. 23, 2022, 13 pages. (Submitted with Machine Translation).
ISA State Intellectual Property Office of the People's Republic of China, Written Opinion of the International Searching Authority Issued in Application No. PCT/CN2020/094245, Feb. 20, 2021, WIPO, 7 pages.

* cited by examiner

INFORMATION TRANSMISSION METHODS AND APPARATUSES, AND COMMUNICATION DEVICES AND STORAGE MEDIUM

CROSS REFERENCE TO RELATED APPLICATIONS

This application is a U.S. national phase application of PCT Application No. PCT/CN2020/094245, filed on Jun. 3, 2020, the entire contents of which are incorporated herein by reference for all purposes.

TECHNICAL FIELD

The present disclosure relates to the field of wireless communication technologies, but is not limited to the field of wireless communication technologies, and in particular to information transmission methods and apparatuses, communication devices, and a storage medium.

BACKGROUND

Along with the development of wireless communication technology and computer technology, more and more artificial intelligences (AI) are applied to the fields such as photography, voice and security, and the like of smart phones so as to improve the use experiences of users.

With the addition of AI, smartphones can not only provide services through information templates but also perform automatic recognition and understand user requirements, and thus can satisfy the user requirements using fuzzy recognition and learning capability, and the like brought by AI.

SUMMARY

In view of the above, the embodiments of the present disclosure provide information transmission methods, a user equipment (UE), and a base station.

According to a first aspect of embodiments of the present disclosure, there is provided an information transmission method, which is applied to a user equipment (UE) and includes:

reporting artificial intelligence (AI) capability information indicating an AI capability of the UE to a base station.

According to a second aspect of embodiments of the present disclosure, there is provided an information transmission method, which is applied to a base station and includes:

receiving artificial intelligence (AI) capability information reported by a UE indicating an AI capability of the UE;

based on the AI capability information, allocating an AI service corresponding to the AI capability to the UE.

According to a third aspect of embodiments of the present disclosure, there is provided a user equipment (UE), including a processor, a transceiver, a memory and an executable program stored in the memory and run by the processor, where the processor runs the executable program to perform operations including: reporting artificial intelligence (AI) capability information indicating an AI capability of the UE to a base station.

According to a fourth aspect of embodiments of the present disclosure, there is provided a base station, including a processor, a transceiver, a memory, and an executable program stored in the memory and run by the processor, where the processor runs the executable program to perform the information transmission method as described in the second aspect.

It should be understood that the above general descriptions and subsequent detailed descriptions are only illustrative and explanatory, rather than limiting the present disclosure.

BRIEF DESCRIPTION OF THE DRAWINGS

The accompanying drawings, which are incorporated in and constitute a part of the present specification, illustrate examples consistent with the present disclosure and serve to explain the principles of the present disclosure together with the specification.

DETAILED DESCRIPTION OF THE EMBODIMENTS

Figures 1, 2:
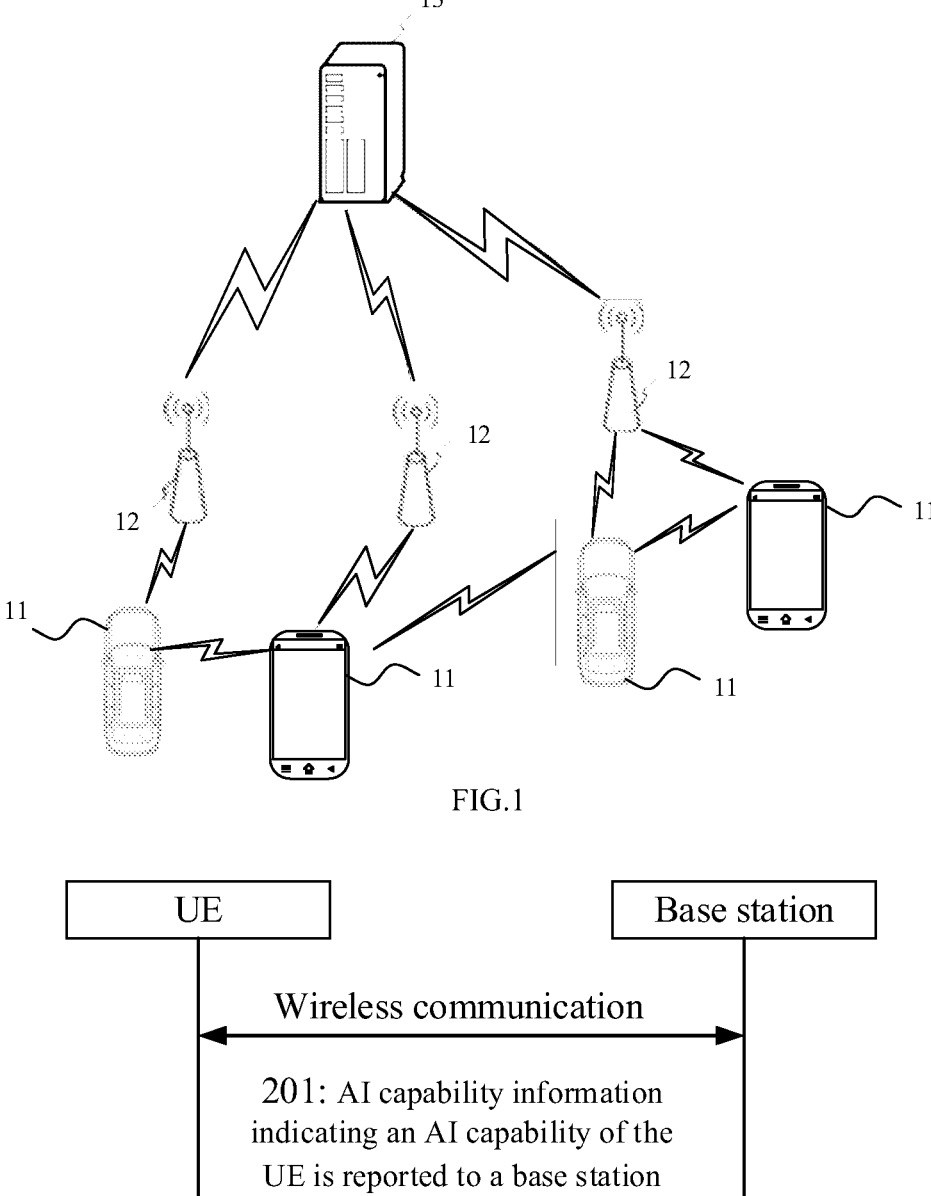
FIG. 1 is a schematic structural diagram illustrating a wireless communication system according to an example of the present disclosure.
FIG. 2 is a schematic flowchart illustrating an information transmission method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms "a," "the," and "said" in their singular forms in the present disclosure and the appended claims are also intended to include a plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, the second information may also be referred to as the first information. Depending on the context, the term "if" as used herein may be interpreted as "when," or, "upon," or "in response to determining."

FIG. 1 is a schematic structural diagram illustrating a wireless communication system according to an embodiment of the present disclosure. As shown in FIG. 1, the wireless communication system is a communication system based on cellular mobile communication technology and may include a plurality of terminals 11 and a plurality of base stations 12.

The terminal 11 may indicate a device that provides voice and/or data connectivity to a user. The terminal 11 may communicate with one or more core networks through a radio access network (RAN). The terminal 11 may be a terminal for the internet of things, such as a sensor device, a mobile phone (or called cellular phone), and a computer having a terminal for the internet of things. For example, the terminal 11 may be an apparatus that is fixed, portable, pocket-sized, handheld, computer-inbuilt, or vehicle-mounted, such as a station (STA), subscriber unit, subscriber station, mobile station, mobile, remote station, access point, remote terminal, access terminal, user terminal, user agent, user device, or user equipment (UE). In some examples, the terminal 11 may be a device of an unmanned aerial vehicle. In some examples, the terminal 11 may be a vehicle-mounted device, such as a trip computer having a wireless communication function, or a wireless communication device externally connected to a trip computer. In some examples, the terminal 11 may be a roadside device, such as a road lamp, signal lamp, or other roadside devices having wireless communication functions.

The base station 12 may be a network side device in a wireless communication system. The wireless communication system may be a fourth-generation mobile communication technology (4G) system, which is also called Long Term Evolution (LTE) system. In some examples, the wireless communication system may also be a 5G system, which is also called new radio (NR) system or 5G NR system. In some examples, the wireless communication system may also be a next generation system of the 5G system. An access network in the 5G system may be referred to as New Generation-Radio Access Network (NG-RAN). In some examples, the wireless communication system may also be referred to as a Machine-Type Communication (MTC) system.

The base station 12 may be an evolved node base station (eNB) employed in the 4G system. In some examples, the base station 12 may be a base station adopting centralized distributed architecture (for example, the next Generation Node B, gNB) in the 5G system. When adopting the centralized distributed architecture, the base station 12 usually includes a central unit (CU) and at least two distributed units (DU). In the central unit, protocol stacks of a Packet Data Convergence Protocol (PDCP) layer, a Radio Link Control (RLC) layer, and a Media Access Control (MAC) layer are disposed; in the distributed unit, a protocol stack of a physical (PHY) layer is disposed. The specific implementations of the base station 12 are not limited to the embodiments of the present disclosure.

The base station 12 and the terminal 11 may establish a wireless connection therebetween through a wireless air interface. In different implementations, the wireless air interface may be a wireless air interface based on the fourth generation mobile communication network technology (4G) standard; or, the wireless air interface may be a wireless air interface based on the fifth generation mobile communication network technology (5G) standard, for example, the wireless air interface is a new radio; or, the wireless air interface may be a wireless air interface based on a next generation mobile communication network technology standard of 5G.

In some embodiments, the terminals 11 may also establish end to end (E2E) connection therebetween, for example, in the scenarios such as vehicle to vehicle (V2V) communication, vehicle to Infrastructure (V2I) communication, and vehicle to pedestrian (V2P) communication, and the like in vehicle to everything (V2X) communication.

In some embodiments, the above wireless communication system may further include a network management device 13.

A plurality of base stations 12 are connected to the network management device 13, respectively. The network management device 13 may be a core network device in the wireless communication system. For example, the network management device 13 may be a Mobility Management Entity (MME) in an Evolved Packet Core (EPC) network. In some examples, the network management device may be other core network devices, such as Serving GateWay (SGW), Public Data Network GateWay (PGW), Policy and Charging Rules Function (PCRF) unit, or Home Subscriber Server (HSS). The implementation morphology of the network management device 13 is not limited to the embodiments of the present disclosure.

The execution subject involved in the embodiments of the present disclosure includes, but is not limited to, a user equipment such as a terminal with AI capability, and a base station for cellular mobile communication, and the like.

In the application scenarios of embodiments of the present disclosure, along with the maturity and commercialization of 5G, the significant features of the 5G network, such as high rate, high reliability and low delay enable a terminal-side AI to perform intelligent synergy with a cloud-side AI so as to realize more functions and bring better experiences to users. Specific features can be reflected as follows.

1. The terminal-side AI can quickly respond to user requirements and quickly display processed images, videos, voices, and text information to users with low power consumption and low costs, and thus it is suitable for AI reasoning tasks.

2. The cloud-side AI can be applied to implementing data aggregation across multiple terminals and has more advantages in aspects such as data throughput, processing rate, and the like, and thus it is suitable for AI model training tasks. Therefore, the processing mode of synergy between the terminal and cloud will play an important role in aspects such as model training, data reasoning, and the like.

3. A command sent by a user is preliminarily processed in a terminal-side intelligent chip and then interacted with cloud through a 5G network in real time, and then a processing result of the cloud is fed back to the user through the 5G network. Thus, data processing capability can be improved, and delay can be effectively reduced.

Along with increasingly powerful processing capability of the terminal, the terminal with the AI capability can process more and more data and make quick feedback and decision. Further, different terminals correspond to different processing capabilities.

But, synergy is still absent between the terminal-side AI and the cloud-side AI. Usually, the terminal-side AI and the cloud-side AI can only process specified contents respectively without interaction and synergy therebetween, and thus cannot coordinate the distribution of the AI-processed tasks. As shown in FIG. 2, an example of the present disclosure provides an information transmission method, which is applied to a user equipment such as a terminal of a communication system and the like. The information transmission method includes the following steps.

At step 201, AI capability information indicating an AI capability of the UE is reported to a base station.

Herein, the communication system may be a cellular mobile communication system. The user equipment may be a human-machine interaction device, such as a mobile phone terminal with AI capability, a self-service terminal, and the like.

AI capability may be a capability that the UE performs AI-related data computation or an AI function that the UE possesses. The reported AI capability may include: whether the UE has an AI capability, and/or, AI data processing rate of the UE such as a computing capability of a processor, and/or, an amount of AI data processable by the UE, and/or, AI model supported by the UE, and/or, a computing capability of the UE for a specific AI algorithm and the like.

Different UEs have different AI capabilities. For example, when the UE has a GPU, it is determined that the UE has an AI capability. Because the GPU is designed to perform the multiplication of a four-dimensional vector and a transformation matrix, the GPU has a strong computing capability for a neural network. Therefore, the UE having the GPU has a good AI capability. In some examples, when the UE has a CPU supporting multi-byte computation, it is determined that the UE has an AI capability. Herein, the multi-byte computation, compared with single-byte computation, can perform simultaneous computation for multiple bytes, thereby improving computing efficiency as well as computing capability. Thus, the UE has strong AI capability. The UE with the AI computing capability also needs to have different AI software models to achieve different AI functions, for example, when the UE has a fingerprint recognition AI software model, a fingerprint recognition function can be implemented.

Different AI capabilities are applicable to different AI services. For example, processors with different computing capabilities can process different AI services, and thus, a UE with a higher processor computing capability can process more complex AI services. The AI services may include: AI algorithm, data processing service, data service, and the like. For example, the AI services may include AI human face recognition, and a UE with a stronger image processing capability can complete AI human face recognition within the UE.

A network-side device, such as the base station and the like, can determine an AI service processable by the UE based on the AI capability reported by the UE and allocate an AI service corresponding to the AI capability to the UE.

For example, when the base station determines that the AI capability reported by the UE can support the AI human face recognition service, the base station can configure the AI human face recognition service onto the UE for execution. Thus, human face image data transmission between the UE and the base station for performing the AI human face recognition service at the network side can be reduced, and the network resource consumption can also be reduced. Herein, different AI human face recognition services require different AI capabilities. For example, the AI human face recognition service may include a three-dimensional human face recognition and a two-dimensional human face recognition, and the like. The three-dimensional human face recognition and the two-dimensional human face recognition require different AI capabilities of the UE. For the three-dimensional human face recognition, the UE needs to have a depth camera in hardware, and an algorithm model supporting deep human face recognition in software.

Therefore, for the three-dimensional human face recognition service, the AI capability may also include a hardware AI capability and a software AI capability.

For another example, when the base station determines that the processing capability of the processor of the UE is higher than a capability threshold, the base station may allocate those AI services requiring much computation, such as AI model training to the UE such that the UE can perform AI model training, thereby reducing the computation amount at the network side. Further, data transmission between the UE and the base station for the base station performing AI model training can be reduced, and the network resource consumption can also be reduced.

Therefore, on the one hand, the UE reports the AI capability to the base station, such that the base station can learn the AI capability of the UE, thereby improving information interaction between the UE and the base station and increasing the transparency of the UE capability information. On the other hand, the base station can coordinate the allocation of the AI service based on the AI capability so as to improve an AI service synergy capability between the UE and the base station, and realize resource optimization and effective utilization of the AI capability of the UE.

In an embodiment, when accessing the base station, the UE may report the AI capability information indicating the AI capability of the UE to the base station. The base station can determine the AI capability of the UE when the UE accesses the base station. The base station can allocate the AI services when the UE accesses the base station. In this way, information delay, which results from reporting the AI capability after accessing, can be diminished, and the AI service allocation efficiency can be improved.

In an embodiment, the step 201 may include:

reporting the AI capability information indicating a hardware AI capability and/or a software AI capability of the UE to the base station.

The hardware AI capability may be a capability that the UE hardware processes the AI service, for example, whether the UE has an AI processor, and/or, whether the UE has a hardware configuration necessary for AI service, for example, whether the UE has a fingerprint recognition module, and/or an AI computing rate of the UE and the like.

The software AI capability may be an AI software function that the UE possesses, and an AI model that the UE supports, and the like, for example, whether the UE has a human face recognition AI model, and the like.

The base station may allocate corresponding AI services based on different hardware AI capabilities and/or software AI capabilities.

For example, for a UE with human face recognition capability, the base station may allocate the human face recognition service to the UE for execution. Thus, the AI computing load at the network side can be reduced, and the network communication load can also be decreased.

In an embodiment, the UE can at least report the hardware AI capability.

The base station can determine an AI service processable by the UE based on the hardware AI capability.

In an embodiment, the base station may also send a software AI capability related to AI service to the UE based on the hardware AI capability reported by the UE.

In some examples, when the base station determines the hardware AI capability of the UE satisfies the requirements of the AI service, but the UE does not have the software AI capability required by the AI service, the base station may send a software development kit (SDK) or AI application program of related AI model required by the AI service or the like to the UE. In this case, the UE can satisfy the requirements of the AI service in both hardware AI capability and software AI capability. The software development kit of the AI model may include different AI models and provide AI model application program interfaces. The AI models can achieve corresponding AI function using input data of the AI model application program interfaces and thus, the UE can carry out different AI services based on a combination of the hardware AI capability and the SDK.

The base station may configure a corresponding AI service to the UE based on the hardware AI capability reported by the UE and the software AI capability sent by the base station to the UE.

In an embodiment, the hardware AI capability includes:
a computing capability parameter of a processor of the UE.

Here, the processor of the UE may include: a central processing unit (CPU), and/or, a graphics processing unit (GPU), and/or a digital signal processor (DSP), and/or an AI processor and the like.

The processor of the UE can perform AI computation separately or in synergy.

The computing capability parameter of the processor may be a technical rate for AI data or the like.

In an embodiment, the computing capability parameter of the processor of the UE includes:
a computing capability parameter of the processor of the UE for integers (int), and/or a computing capability parameter of the processor of the UE for floats.

The computing capability of the processor for integers may affect performances of data compression and decompression, process scheduling, compiler syntax analysis, computer circuit auxiliary designing and game AI processing type, and the like.

The computing capability of the processor for floats mainly affects the scientific computational performances of the processor, for example, the performances of coding and decoding of audio and video, and image processing, and the like.

After the UE uploads the computing capability parameter for integers and/or the computing capability parameter for floats, the base station can assess a partial AI capability or an entire AI capability of the UE so as to configure an AI service corresponding to the AI capability of the UE.

In an embodiment, the computing capability parameter includes:
a computing rate;
and/or,
a ratio of the computing rate to power consumption.

The computing rate may be a number of operations of the UE processor per second, which is denoted by TOPS. The TOPS represents one trillion operations per second. Further, it may also be denoted by GOPS or MOPS. GOPS represents one billion operations per second, and MOPS represents one million operations per second. TOPS, GOPS and MOPS all are units for measuring a number of operations of the UE per second. Usually, the AI capability of the UE can be referred to as TOPS capability, GOPS capability or MOPS capability.

The computing rate may be a computing rate for integers. For example, the integer may include data of 8-byte integer (int8) type and the like. The computing rate for the data of int8 type may be referred to as TOPS capability of data of int8 type, i.e., the number of trillions of operations of the UE per second for the data of int8 type.

The computing rate may be a computing rate for floats. For example, the integer may include data of 16-byte float (Float16) type and the like. The computing rate of the data of Float16 type may be referred to as TOPS capability of the data of Float16 type, i.e., the number of trillions of operations of the UE per second for the data of Float16 type.

The network side may also use a ratio of computing rate to power consumption as a performance indicator for assessing the computing capability of the processor. For example, TOPS/W is used to assess the performance of the processor, that is, TOPS/W is used to measure the number of trillions of operations of the processor in a case of 1 W power consumption.

Here, the ratio of computing rate to power consumption may include but is not limited to: the number of trillions of operations of the processor for the data of int8 type in a case of 1 W power consumption, i.e., int8 TOPS/Watt, and/or, the number of trillions of operations of the processor for the data of Float16 type in a case of 1 W power consumption, i.e., Float16 TOPS/Watt.

In an embodiment, the computing capability parameter of the processor of the UE includes:
a maximum computing rate and/or a minimum computing rate supported by the processor of the UE.

The UE may send the maximum computing rate and/or the minimum computing rate, and the base station may determine the upper and lower limits of the AI capability of the UE so as to allocate an AI service suitable for the UE.

In an embodiment, the software AI capability includes:
an on-device AI model, and/or a type of an AI application program interface currently possessed by the UE.

The on-device AI model may be an AI model inside the UE, such as an AI algorithm model, a neural network model, and the like. Different on-device AI models can achieve data processing of different AI services, or different on-device AI models perform optimization for different AI services. When the UE needs to perform data computation of a particular type, the base station may arrange to directly adopt the on-device AI model of the UE for computation without uploading the data to the network side. On the one hand, the network communication load is reduced, and on the other hand, computation is directly performed on the UE, thus improving the efficiency.

Here, the AI application program interface may be an interface provided by an AI application program of the UE. AI application programs of the UE can achieve different predetermined AI functions. The predetermined AI function can be performed on the UE based on input data obtained by the AI application program interface, so as to obtain a desired result to be output by the AI application program interface. Different AI application program interfaces may correspond to different AI application programs in the UE to satisfy different AI service requirements. For example, image recognition API can recognize different objects in an input image and mark the objects. For another example, a human face recognition API can perform identity recognition or the like based on an input human face image. The base station may allocate a corresponding AI service based on the API of the UE. In this way, on the one hand, network communication load is reduced, and on the other hand, AI service processing is directly performed on the UE, thus improving the efficiency.

In an embodiment, the step 201 may include:
reporting the AI capability information indicating an identifier of the on-device AI model supported by the UE to the base station.

Each on-device AI model has a unique identifier, and the UE may indicate an on-device AI model that it has in a manner of uploading the identifier.

The base station may determine the on-device AI model that the UE has based on the identifier.

In an embodiment, the step 201 may include: reporting overall AI capability information indicating an overall AI capability of the UE to the base station;

and/or, reporting remaining AI capability information indicating a remaining AI capability of the UE to the base station.

The UE may report the overall AI capability of the UE to the base station, for example, report an overall processing capability of the processor of the UE, and an on-device AI model of the UE. The base station may, based on the overall AI capability of the UE, determine an AI service to be allocated.

The UE may report the overall AI capability and the remaining AI capability of the UE to the base station at the same time, or, the UE may only report the remaining AI capability for indicating a currently available AI capability of the UE. The base station may, based on the remaining AI capability of the UE, determine an AI service additionally bearable by the UE.

Thus, the UE can report the overall AI capability and/or the remaining AI capability such that the base station can perform flexible allocation for the AI service based on the reported AI capability. In this case, the allocated AI service will correspond to the AI capability of the UE.

The step 201 may include: sending a first radio resource control (RRC) signaling carrying the AI capability information to the base station.

The UE may send the RRC signaling carrying the AI capability information to the base station. For example, the UE may carry the AI capability information in an RRC signaling upon establishing the RRC connection.

The first RRC signaling may be a newly-added RRC signaling. The first RRC signaling may also be an existing RRC signaling, and the AI capability information may be borne by reserved bits. The AI capability information is carried in the existing RRC signaling, such that an amount of information carried in the existing RRC signaling is increased, and the utilization efficiency of the RRC signaling is improved.

In an embodiment, the first RRC signaling includes one of:

a UE-EUTRA-Capability signaling; or a UE-NR-Capability signaling.

The AI capability information may be carried in the reserved bits of the UE-EUTRA-Capability signaling or UE-NR-Capability signaling. Thus, the information-bearing capacity of the UE-EUTRA-Capability signaling or UE-NR-Capability signaling can be increased, and the utilization efficiency of the signaling can also be improved.

In an embodiment, the step 201 may include: in response to receiving a second RRC signaling carrying an AI capability enquiry request, reporting the AI capability information to the base station.

The UE may not actively report the AI capability of the UE. The base station may learn the AI capability of the UE by enquiry.

The base station may enquire for the AI capability of the UE through RRC signaling. The base station may add an RRC signaling carrying the AI capability enquiry request, or, carry the AI capability enquiry request in the reserved bits of the existing RRC signaling.

After receiving the RRC signaling carrying the AI capability enquiry request, the UE may report its own AI capability.

In an embodiment, the second RRC signaling includes:

a UECapabilityEnquiry signaling, where the UECapabilityEnquiry signaling includes a first information element (IE) and a second IE, where, the first IE carries the AI capability enquiry request;

the second IE carries a network capability enquiry request.

The AI capability enquiry request may be carried in an existing UECapabilityEnquiry signaling. The UECapabilityEnquiry signaling may be used to enquire for a network capability of the UE, such as a network transmission rate and the like. An IE may be added to carry the AI capability enquiry request. Thus, the information-bearing capacity of the UECapabilityEnquiry signaling can be increased, and the signaling utilization efficiency can be improved.

After receiving the UECapabilityEnquiry signaling carrying the AI capability enquiry request, the UE may report its own AI capability.

Figure 3:
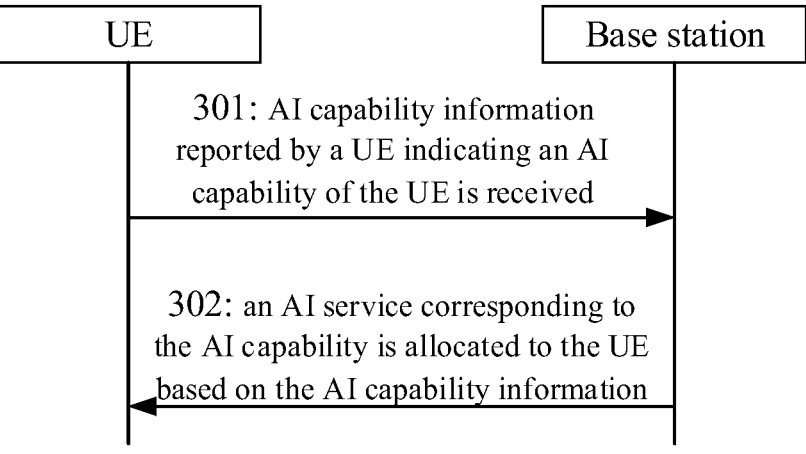
FIG. 3 is a schematic flowchart illustrating another information transmission method according to an example of the present disclosure.

As shown in FIG. 3 an embodiment of the present disclosure provides an information transmission method, which is applied to a base station in a communication system. The information transmission method may include the following steps.

At step 301, AI capability information reported by a UE indicating an AI capability of the UE is received.

At step 302, an AI service corresponding to the AI capability is allocated to the UE based on the AI capability information.

Here, the communication system may be a cellular mobile communication system, and the user equipment may be a human-machine interaction device, such as a mobile phone terminal with AI capability, a self-service terminal, and the like.

AI capability may be a capability that the UE performs AI-related data computation or an AI function that the UE possesses. The reported AI capability may include: whether the UE has an AI capability, and/or, an AI data processing rate of the UE, such as a computing capability of a processor, and/or, an amount of AI data processable by the UE, and/or, an AI model supported by the UE, and/or, a computing capability of the UE for a specific AI algorithm and the like.

Different UEs have different AI capabilities. For example, when the UE has a GPU, it is determined that the UE has an AI capability. Because the GPU is designed to perform the multiplication of a four-dimensional vector and a transformation matrix, the GPU has a strong computing capability for a neural network. Therefore, the UE having the GPU has a good AI capability. In some examples, when the UE has a CPU supporting multi-byte computation, it is determined that the UE has an AI capability. Herein, the multi-byte computation, compared with single byte computation, can perform simultaneous computation for multiple bytes, thereby improving computing efficiency as well as computing capability. Thus, the UE has a strong AI capability. The UE with the AI computing capability also needs to have different AI software models to achieve different AI functions. For example, when the UE has a fingerprint recognition AI software model, a fingerprint recognition function can be implemented.

Different AI capabilities are applicable to different AI services. For example, processors with different computing capabilities can process different AI services and thus a UE with a higher processor computing capability can process more complex AI services. The AI services may include: AI algorithm, data processing service, data service, and the like. For example, the AI services may include AI human face recognition, and a UE with a stronger image processing capability can complete AI human face recognition within the UE.

A network side device, such as the base station and the like, can determine an AI service processable by the UE based on the AI capability reported by the UE and allocate an AI service corresponding to the AI capability to the UE.

For example, when the base station determines that the AI capability reported by the UE can support the AI human face recognition service, the base station can configure the AI human face recognition service onto the UE for execution. Thus, human face image data transmission between the UE and the base station for performing the AI human face recognition service at the network side can be reduced, and the network resource consumption can also be reduced.

Herein, different AI human face recognition services require different AI capabilities. For example, the AI human face recognition service may include a three-dimensional human face recognition and a two-dimensional human face recognition, and the like. The three-dimensional human face recognition and the two-dimensional human face recognition require different AI capabilities of the UE. For the three-dimensional human face recognition, the UE needs to have a depth camera in hardware, and an algorithm model supporting deep human face recognition in software. Therefore, for the three-dimensional human face recognition service, the AI capability may also include a hardware AI capability and a software AI capability.

For another example, when the base station determines that the processing capability of the processor of the UE is higher than a capability threshold, the base station may allocate those AI services requiring much computation, such as AI model training to the UE such that the UE can perform AI model training, thereby reducing the computation amount at the network side. Further, data transmission between the UE and the base station for the base station performing AI model training can be reduced, and the network resource consumption can also be reduced.

Therefore, on the one hand, the UE reports the AI capability to the base station, such that the base station can learn the AI capability of the UE, thereby improving information interaction between the UE and the base station and increasing the transparency of the UE capability information. On the other hand, the base station can coordinate the allocation of the AI service based on the AI capability so as to improve an AI service synergy capability between the UE and the base station, and realize resource optimization and effective utilization of the AI capability of the UE.

In an embodiment, when accessing the base station, the UE may report the AI capability information indicating the AI capability of the UE to the base station. The base station can determine the AI capability of the UE when the UE accesses the base station. The base station can allocate the AI service when the UE accesses the base station. In this way, information delay, which results from reporting the AI capability after accessing, can be diminished, and the AI service allocation efficiency can be improved.

In an embodiment, the step 301 may include:

receiving the AI capability information indicating reported by the UE a hardware AI capability and/or a software AI capability of the UE;

based on the AI capability information, allocating the AI service corresponding to the AI capability to the UE includes:

allocating an AI service corresponding to the hardware AI capability and/or the software AI capability to the UE.

The hardware AI capability may be a capability that the UE hardware processes the AI service, for example, whether the UE has an AI processor, and/or, whether the UE has a hardware configuration necessary for AI service, for example, whether the UE has a fingerprint recognition module, and/or an AI computing rate of the UE and the like.

The software AI capability may be an AI software function that the UE possesses, and the AI model that the UE supports, and the like, for example, whether the UE has a human face recognition AI model, and the like.

The base station may allocate corresponding AI services based on different hardware AI capabilities and/or software AI capabilities.

For example, for a UE with human face recognition capability, the base station may allocate the human face recognition service to the UE for execution. Thus, the AI computing load at the network side can be reduced, and the network communication load can also be decreased.

In an embodiment, the UE can at least report the hardware AI capability.

The base station can determine an AI service processable by the UE based on the hardware AI capability.

In an embodiment, the base station may also send a software AI capability related to AI service to the UE based on the hardware AI capability reported by the UE.

In some examples, when the base station determines the hardware AI capability of the UE satisfies the AI service requirements, but the UE does not have the software AI capability required by the AI service, the base station may send a software development kit (SDK) or AI application program of related AI model required by the AI service or the like to the UE. In this case, the UE can satisfy the AI service requirements in both hardware AI capability and software AI capability. The AI model software development kit may include different AI models and provide AI model application program interfaces. The AI models can achieve corresponding AI function using input data of the AI model application program interfaces and thus, the UE can carry out different AI services based on a combination of the hardware AI capability and the SDK.

The base station may configure a corresponding AI service to the UE based on the hardware AI capability reported by the UE and the software AI capability sent by the base station to the UE.

In an embodiment, the hardware AI capability includes:

a computing capability parameter of a processor of the UE.

Here, the processor of the UE may include: a central processing unit (CPU), and/or, a graphics processing unit (GPU), and/or a digital signal processor (DSP), and/or an AI processor and the like.

The processor of the UE can perform AI computation separately or in synergy.

The computing capability parameter of the processor may be a technical rate for AI data or the like.

In an embodiment, the computing capability parameter of the processor of the UE includes:

a computing capability parameter of the processor of the UE for integers (int), and/or a computing capability parameter of the processor of the UE for floats.

The computing capability of the processor for integers can affect performances of data compression and decompression, process scheduling, compiler syntax analysis, computer circuit auxiliary designing and game AI processing type, and the like.

The computing capability of the processor for floats mainly affects the scientific computational performances of the processor, for example, the performances of coding and decoding of audio and video and image processing and the like.

After the UE uploads the computing capability parameter for integers and/or the computing capability parameter for floats, the base station can assess a partial AI capability or an entire AI capability of the UE so as to configure an AI service corresponding to the AI capability of the UE.

In an embodiment, the computing capability parameter includes:

a computing rate;

and/or, a ratio of the computing rate to power consumption.

The computing rate may be a number of operations of the UE processor per second, which is denoted by TOPS. The TOPS represents one trillion operations per second. Further, it may also be denoted by GOPS or MOPS. GOPS represents one billion operations per second, and MOPS represents one million operations per second. TOPS, GOPS and MOPS all are units for measuring a number of operations of the UE per second. Usually, the AI capability of the UE can be referred to as TOPS capability, GOPS capability, or MOPS capability.

The computing rate may be a computing rate for integers. For example, the integers may include data of 8-byte integer (int8) type and the like. The computing rate for the data of int8 type may be referred to as TOPS capability of data of int8 type, i.e., the number of trillions of operations of the UE per second for the data of int8 type.

The computing rate may be a computing rate for floats. For example, the integers may include data of 16-byte float (Float16) type and the like. The computing rate of the data of Float16 type may be referred to as TOPS capability of the data of Float16 type, i.e., the number of trillions of operations of the UE per second for the data of Float16 type.

The network side may also use a ratio of computing rate to power consumption as a performance indicator for assessing the computing capability of the processor. For example, TOPS/W is used to assess the performance of the processor, that is, TOPS/W is used to measure the number of trillions of operations of the processor in a case of 1 W power consumption.

Here, the ratio of computing rate to power consumption may include but is not limited to: the number of trillions of operations of the processor for the data of int8 type in a case of 1 W power consumption, i.e., int8 TOPS/Watt, and/or, the number of trillions of operations of the processor for the data of Float16 type in a case of 1 W power consumption, i.e., Float16 TOPS/Watt.

In an embodiment, the computing capability parameter of the processor of the UE includes:

a maximum computing rate and/or a minimum computing rate supported by the processor of the UE.

The UE may send the maximum computing rate and/or the minimum computing rate, and the base station may determine upper and lower limits of the AI capability of the UE so as to allocate an AI service suitable for the UE.

In an embodiment, a software AI capability includes:

an on-device AI model, and/or a type of an AI application program interface currently possessed by the UE.

The on-device AI model may be an AI model inside the UE, such as an AI algorithm model, a neural network model, and the like. Different on-device AI models can achieve data processing of different AI services or different on-device AI models perform optimization for different AI services. When the UE needs to perform data computation of a particular type, the base station may arrange to directly adopt the on-device AI model of the UE for computation without uploading the data to the network side. On the one hand, the network communication load is reduced, and on the other hand, computation is directly performed on the UE, thus improving the efficiency.

Here, the AI application program interface may be an interface provided by the AI application program of the UE. The AI application programs of the UE can achieve different predetermined AI functions. The predetermined AI function can be performed on the UE based on the input data obtained by the AI application program interface, so as to obtain a desired result to be output by the AI application program interface. Different AI application program interfaces may correspond to different AI application programs in the UE to satisfy different AI service requirements. For example, image recognition API can recognize different objects in an input image and mark the objects. For another example, human face recognition API can perform identity recognition or the like based on input human face image. The base station may allocate a corresponding AI service based on the API of the UE. In this way, on the one hand, the network communication load is reduced, and on the other hand, AI service processing is directly performed on the UE, thus improving the efficiency.

In an embodiment, the step 301 may include:

receiving the AI capability information reported by the UE indicating an identifier of the on-device model;

based on the identifier, determining the on-device AI model supported by the UE.

Each on-device AI model has a unique identifier, and the UE may indicate an on-device AI model that it has by uploading the identifier.

The base station may determine the on-device AI model that the UE has based on the identifier.

In an embodiment, the step 301 may include:

receiving overall AI capability information reported by the UE indicating an overall AI capability of the UE;

and/or, receiving remaining AI capability information reported by the UE indicating a remaining AI capability of the UE.

The UE may report the overall AI capability of the UE to the base station, for example, report an overall processing capability of the processor of the UE, and the on-device AI model of the UE. The base station may, based on the overall AI capability of the UE, determine an AI service to be allocated.

The UE may report the overall AI capability and the remaining AI capability of the UE to the base station at the same time, or, the UE may only report the remaining AI capability for indicating a currently available AI capability of the UE. The base station may, based on the remaining AI capability of the UE, determine an AI service additionally bearable by the UE.

Thus, the UE can report the overall AI capability and/or the remaining AI capability such that the base station can perform flexible allocation for the AI service based on the reported AI capability. In this case, the allocated AI service will correspond to the AI capability of the UE.

In an embodiment, the step 301 may include:

receiving a first RRC signaling carrying the AI capability information.

The UE may send the RRC signaling carrying the AI capability information to the base station. For example, the UE may carry the AI capability information in an RRC signaling upon establishing the RRC connection.

The first RRC signaling may be a newly-added RRC signaling. The first RRC signaling may also be an existing RRC signaling, and the AI capability information may be borne by reserved bits. The AI capability information is carried in the existing RRC signaling, such that an amount of information carried in the existing RRC signaling is increased and the utilization efficiency of the RRC signaling is improved.

In an embodiment, the first RRC signaling includes one of:

a UE-EUTRA-Capability signaling; or a UE-NR-Capability signaling.

The AI capability information may be carried in the reserved bits of the UE-EUTRA-Capability signaling or UE-NR-Capability signaling. Thus, the information-bearing capacity of the UE-EUTRA-Capability signaling or UE-NR-Capability signaling can be increased, and the utilization efficiency of the signaling can also be improved.

In an embodiment, the information transmission method may further include:

sending a second RRC signaling carrying the AI capability enquiry request;

the step 301 may include:

receiving the AI capability information of the UE, which is reported to the base station by the UE in response to the AI capability enquiry request.

The UE may not actively report the AI capability of the UE. The base station may learn the AI capability of the UE by enquiry.

The base station may enquire for the AI capability of the UE through RRC signaling. The base station may add an RRC signaling carrying the AI capability enquiry request, or, carry the AI capability enquiry request in the reserved bits of the existing RRC signaling.

After receiving the RRC signaling carrying the AI capability enquiry request, the UE may report its own AI capability.

In an embodiment, the second RRC signaling includes:

a UECapabilityEnquiry signaling, where the UECapabilityEnquiry signaling includes a first information element (IE) and a second IE, where, the first IE carries the AI capability enquiry request;

the second IE carries a network capability enquiry request.

The AI capability enquiry request may be carried in an existing UECapabilityEnquiry signaling. The UECapabilityEnquiry signaling may be used to enquire for a network capability of the UE, such as a network transmission rate and the like. An IE may be added to carry the AI capability enquiry request. Thus, the information-bearing capacity of the UECapabilityEnquiry signaling can be increased, and the utilization efficiency of the signaling can be improved.

After receiving the UECapabilityEnquiry signaling carrying the AI capability enquiry request, the UE may report its own AI capability.

In an embodiment, the base station may, based on the AI capabilities reported by multiple UEs, split one AI service into multiple AI sub-services and allocate them to the UEs having AI capabilities corresponding to the sub-services, respectively.

In some examples, when an AI sub-service requires image recognition and voice recognition at a conference scene at the same time, if the first UE only has an AI capability of image recognition and the second UE only has an AI capability of voice recognition, or if the first UE and the second UE do not have the capability to complete image recognition and voice recognition at the same time, the base station may configure the image recognition service of the conference scene to the first UE and configure the voice recognition service of the conference scene to the second UE. In this way, a reasonable allocation of AI resources can be achieved, and the utilization efficiency of the AI resources can be improved.

A specific example is provided below in combination with any one of the above embodiments.

This example provides a method of fusing an AI and a cellular network.

when a terminal accesses a base station, the terminal reports its own AI capability to the base station.

The AI capability of the terminal may include a hardware capability and a software capability.

The AI hardware capability of the terminal may include supported TOPS capabilities, for example, a minimum supported TOPS and a maximum supported TOPS.

The AI hardware capability of the terminal may include a supported TOPS capability, which may be int8 TOPS.

The AI hardware capability of the terminal may include a supported TOPS capability which may be float16 TOPS.

The AI hardware capability of the terminal may include a supported TOPS capability, which may be int8 TOPS/Watt.

The AI hardware capability of the terminal may include a supported TOPS capability which may be float16 TOPS/Watt.

The AI software capability of the terminal may include a supported on-device model.

The AI software capability of the terminal may include a supported API type.

The supported on-device model may be indicated by an agreed ID corresponding to each model.

The terminal may report its AI capability through RRC signaling.

The terminal reports its AI capability through UE-EUTRA-Capability signaling or UE-NR-Capability signaling.

The terminal may report its remaining AI capability and/or overall AI capability.

The base station may actively enquire about the AI capability of the terminal through RRC signaling.

The base station may enquire about the AI capability of the terminal by adding a relevant IE in the UECapabilityEnquiry signaling.

After learning the AI capability of the terminal, the base station may configure a matching AI service for the terminal.

Figure 4:
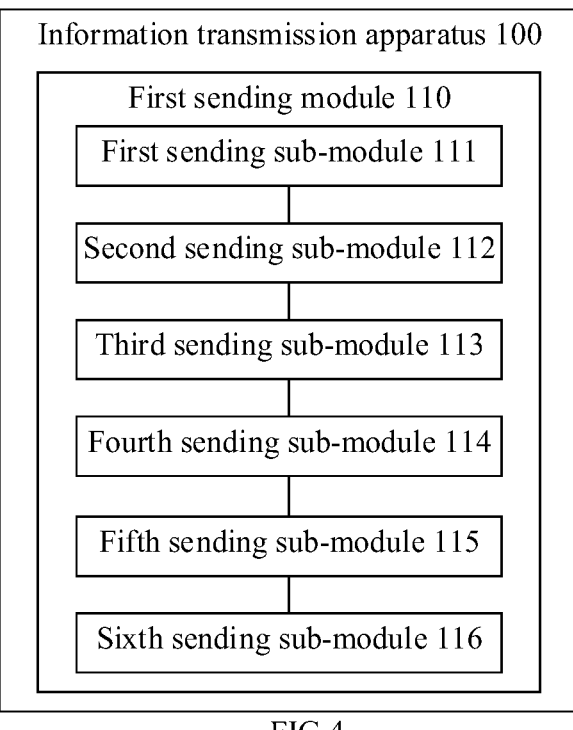
FIG. 4 is a block diagram illustrating an information transmission apparatus according to an example of the present disclosure.

An embodiment of the present disclosure further provides an information transmission apparatus, which is applied to a user equipment (UE) in a communication system. FIG. 4 is a schematic structural diagram of components of an information transmission apparatus 100 according to an embodiment of the present disclosure. As shown in FIG. 4, the apparatus 100 includes a first sending module 110, where, the first sending module 110 is configured to report AI capability information indicating an AI capability of the UE to a base station.

In an embodiment, the first sending module 110 includes:

a first sending sub-module 111, configured to report the AI capability information indicating a hardware AI capability and/or a software AI capability of the UE to the base station.

In an embodiment, the hardware AI capability includes:

a computing capability parameter of a processor of the UE.

In an embodiment, the computing capability parameter of the processor of the UE includes:

a computing capability parameter of the processor of the UE for integers, and/or a computing capability parameter of the processor of the UE for floats.

In an embodiment, the computing capability parameter includes:

a computing rate;

and/or, a ratio of the computing rate to power consumption.

In an embodiment, the computing capability parameter of the processor of the UE includes:

a maximum computing rate and/or a minimum computing rate supported by the processor of the UE.

In an embodiment, a software AI capability includes:

an on-device AI model and/or a type of an AI application program interface currently possessed by the UE.

In an embodiment, the first sending module 110 includes:

a second sending sub-module 112, configured to report the AI capability information indicating an identifier of the on-device model supported by the UE to the base station.

In an embodiment, the first sending module 110 includes:

a third sending sub-module 113, configured to report overall AI capability information indicating an overall AI capability of the UE to the base station;

and/or, a fourth sending sub-module 114, configured to report remaining AI capability information indicating a remaining AI capability of the UE to the base station.

In an embodiment, the first sending module 110 includes:

a fifth sending sub-module 115, configured to send a first RRC signaling carrying the AI capability information to the base station.

In an embodiment, the first RRC signaling includes one of:

a UE-EUTRA-Capability signaling; or a UE-NR-Capability signaling.

In an embodiment, the first sending module 110 includes:

a sixth sending sub-module 116, configured to, in response to receiving a second RRC signaling carrying an AI capability enquiry request, report the AI capability information to the base station.

In an embodiment, the second RRC signaling includes:

a UECapabilityEnquiry signaling, wherein the UECapabilityEnquiry signaling includes a first information element (IE) and a second IE, where, the first IE carries the AI capability enquiry request;

the second IE carries a network capability enquiry request.

Figure 5:
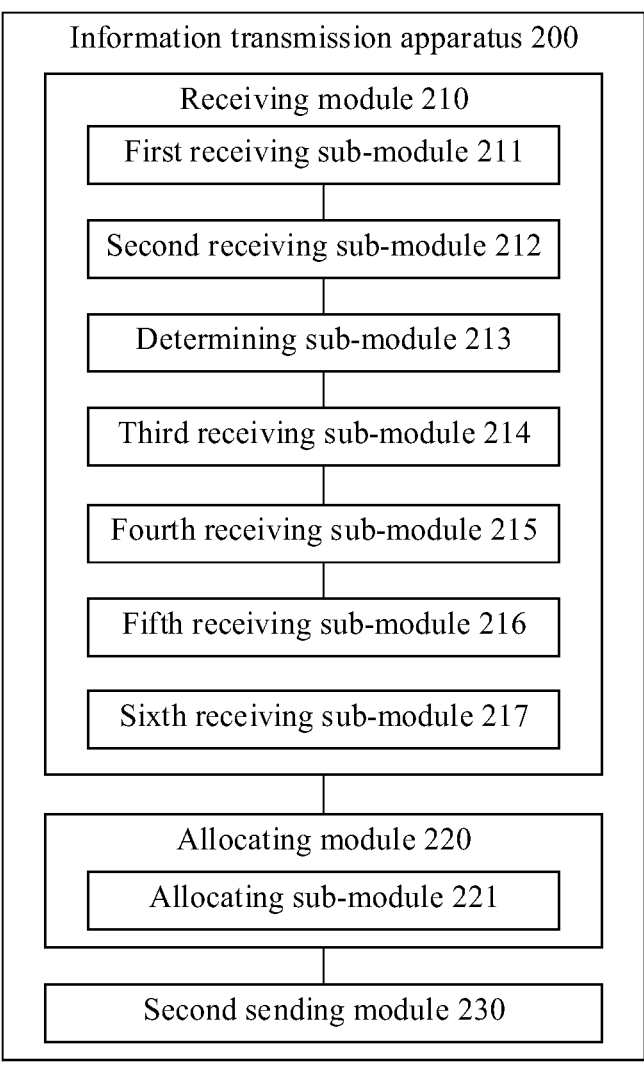
FIG. 5 is a block diagram illustrating another information transmission apparatus according to an example of the present disclosure.

An embodiment of the present disclosure further provides an information transmission apparatus, which is applied to a base station in a communication system. FIG. 5 is a structural schematic diagram of components of an information transmission apparatus 200 according to an embodiment of the present disclosure. As shown in FIG. 5, the apparatus 200 includes a receiving module 210 and an allocating module 220, where, the receiving module 210 is configured to receive AI capability information reported by a UE indicating an AI capability of the UE;

the allocating module 220 is configured to allocate an AI service corresponding to the AI capability to the UE based on the AI capability information.

In an embodiment, the receiving module 210 includes:

a first receiving sub-module 211, configured to receive the AI capability information reported by the UE indicating a hardware AI capability and/or a software AI capability of the UE;

the allocating module 220 includes:

an allocating sub-module 221, configured to allocate an AI service corresponding to the hardware AI capability and/or the software AI capability to the UE.

In an embodiment, the hardware AI capability includes:

a computing capability parameter of a processor of the UE.

In an embodiment, the computing capability parameter of the processor of the UE includes:

a computing capability parameter of the processor of the UE for integers, and/or a computing capability parameter of the processor of the UE for floats.

In an embodiment, the computing capability parameter includes:

a computing rate;

and/or, a ratio of the computing rate to power consumption.

In an embodiment, the computing capability parameter of the processor of the UE includes:

a maximum computing rate and/or a minimum computing rate supported by the processor of the UE.

In an embodiment, a software AI capability includes:

an on-device AI model and/or a type of an AI application program interface currently possessed by the UE.

In an embodiment, the receiving module 210 includes:

a second receiving sub-module 212, configured to receive the AI capability information reported by the UE indicating an identifier of the on-device AI model;

a determining sub-module 213, configured to determine the on-device AI model supported by the UE based on the identifier.

In an embodiment, the receiving module 210 includes:

a third receiving sub-module 214, configured to receive overall AI capability information reported by the UE indicating an overall AI capability of the UE;

and/or, a fourth receiving sub-module 215, configured to receive remaining AI capability information reported by the UE indicating a remaining AI capability of the UE.

In an embodiment, the receiving module 210 includes:

a fifth receiving sub-module 216, configured to receive a first RRC signaling carrying the AI capability information.

In an embodiment, the first RRC signaling includes one of:

a UE-EUTRA-Capability signaling; or a UE-NR-Capability signaling.

In an embodiment, the apparatus 200 further includes:

a second sending module 230, configured to send a second RRC signaling carrying AI capability enquiry request;

the receiving module 210 includes:

a sixth receiving sub-module 217, configured to receive the AI capability information which is reported to the base station by the UE in response to the AI capability enquiry request.

In an embodiment, the second RRC signaling includes:

a UECapabilityEnquiry signaling, where the UECapabilityEnquiry signaling includes a first information element (IE) and a second IE, where, the first IE carries the AI capability enquiry request;

the second IE carries a network capability enquiry request.

In an example, the first sending module 110, the receiving module 210, allocating module 220 and the second sending module 230 and the like may be implemented by one or more central processing units (CPUs), graphics processing units (GPUs), baseband processors (BPs), Application Specific Integrated Circuits (ASICs), digital signal processors (DSPs), Programmable Logic Devices (PLDs), Complex Programmable Logic Devices (CPLDs), Field-Programmable Gate Arrays (FPGAs), general processors, controllers, micro controller units (MCUs), microprocessors, or other electronic elements, or in combination with one or more radio frequency (RF) antennas, so as to perform the above methods.

Figure 6:
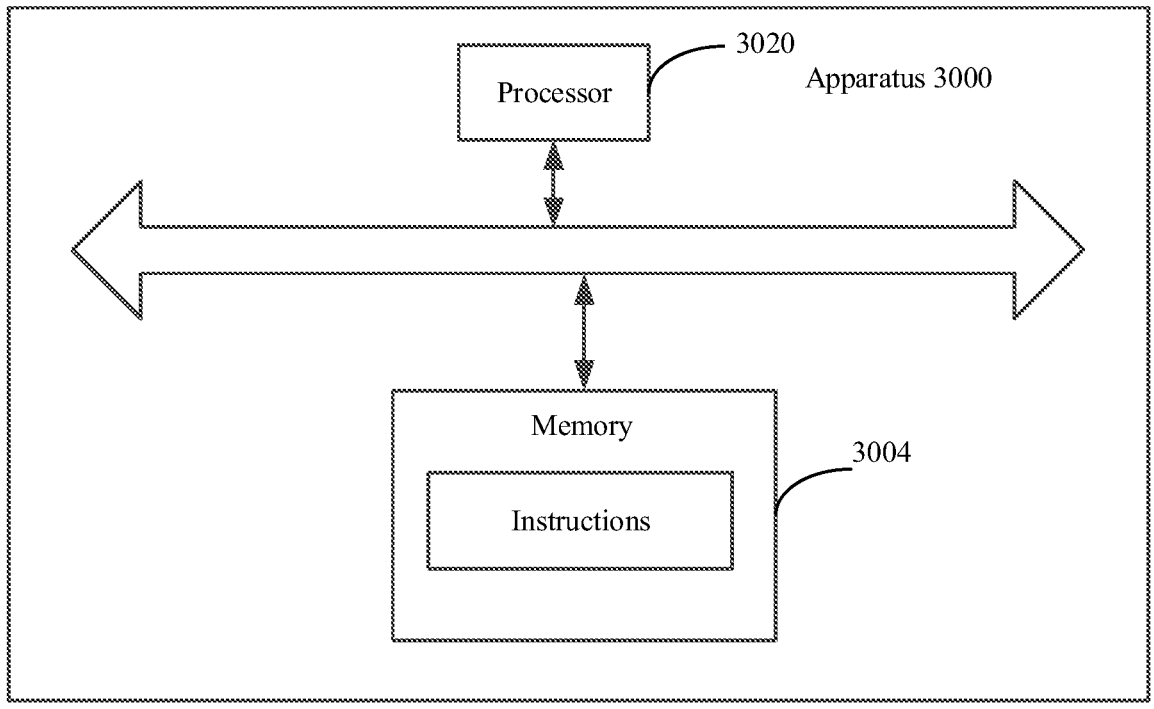
FIG. 6 is a block diagram illustrating an apparatus for information transmission according to an example of the present disclosure.

FIG. 6 is a block diagram of an apparatus 3000 for information transmission according to an example of the present disclosure. For example, the apparatus 3000 may be a mobile phone, a computer, a digital broadcast terminal, a message transceiver, a game console, a tablet device, a medical device, a fitness device, a personal digital assistant, a base station, and the like.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the above methods.

In an example, there is provided a non-transitory computer-readable storage medium storing instructions, for example, a memory 3004 storing instructions. The instructions may be executed by the processor 3020 of the apparatus 3000 to complete the above method. For example, the non-transitory computer readable storage medium may be a Read-Only Memory (ROM), a Random Access Memory (RAM), a CD-ROM, a magnetic tape, a floppy disk, and an optical data storage device and so on.

In the information transmission methods and apparatuses, and the storage medium of the embodiments of the present disclosure, the UE reports the AI capability information indicating the AI capability of the UE to the base station. Thus, the AI capability is reported to the base station through the UE, such that the base station can learn the AI capability of the UE. In this way, information interaction between the UE and the base station is improved, and the transparency of the UE capability information is increased, and thus resource optimization and effective utilization for the AI capability of the UE can be achieved.

Other implementations of the present disclosure will be apparent to those skilled in the art from consideration of the specification and practice of the present disclosure herein. The present disclosure is to cover any variations, uses, modifications, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the embodiments of the present disclosure are not limited to the precise structure described above and shown in the accompanying drawings, and that various modifications and changes may be made without departing from the scope thereof. The scope of the present disclosure is limited only by the appended claims.

The invention claimed is:

1. An information transmission method, performed by a user equipment (UE), and comprising:

in response to receiving a radio resource control (RRC) signaling carrying an artificial intelligence (AI) capability enquiry request, reporting AI capability information indicating an AI capability of the UE to a base station comprises:

reporting the AI capability information indicating a hardware AI capability and a software AI capability of the UE to the base station, wherein the hardware AI capability and the software AI capability are used by the base station to determine an AI service allocated to the UE, wherein the software AI capability comprises a type of an AI application program interface currently possessed by the UE; and receiving the software AI capability sent by the base station based on the hardware AI capability of the UE;

wherein the RRC signaling carrying the AI capability enquiry request comprises:

a UECapabilityEnquiry signaling, wherein the UECapabilityEnquiry signaling comprises a first information element (IE) and a second IE, wherein the first IE carries the AI capability enquiry request and the second IE carries a network capability enquiry request.

2. The information transmission method of claim 1, wherein the hardware AI capability comprises:

a computing capability parameter of a processor of the UE;

wherein the computing capability parameter of the processor of the UE comprises at least one of:

a computing capability parameter of the processor of the UE for integers, or a computing capability parameter of the processor of the UE for floats.

3. The information transmission method of claim 2, wherein the computing capability parameter of the processor of the UE comprises at least one of:

a computing rate; or a ratio of the computing rate to power consumption;

wherein the computing rate comprises at least one of a maximum computing rate or a minimum computing rate supported by the processor of the UE.

4. The information transmission method of claim 2, wherein the software AI capability further comprises:

an on-device AI model currently possessed by the UE.

5. The information transmission method of claim 4, wherein reporting the AI capability information indicating the AI capability of the UE to the base station comprises:

reporting the AI capability information indicating an identifier of the on-device AI model supported by the UE to the base station.

6. The information transmission method of claim 1, wherein reporting the AI capability information indicating the AI capability of the UE to the base station comprises at least one of:

reporting overall AI capability information indicating an overall AI capability of the UE to the base station; or reporting remaining AI capability information indicating a remaining AI capability of the UE to the base station.

7. The information transmission method of claim 1, wherein reporting the AI capability information indicating the AI capability of the UE to the base station comprises:

sending a radio resource control (RRC) signaling carrying the AI capability information to the base station;

wherein the RRC signaling carrying the AI capability information comprises one of:

a UE-Evolved Universal Terrestrial Radio Access (EU-TRA)-Capability signaling; or a UE-New Radio (NR)-Capability signaling.

8. An information transmission method, performed by a base station, comprising:

sending a radio resource control (RRC) signaling carrying an artificial intelligence (AI) capability enquiry request to a user equipment (UE);

receiving AI capability information reported by the UE indicating an AI capability of the UE in response to the AI capability enquiry request;

based on the AI capability information, allocating an AI service corresponding to the AI capability to the UE, wherein the receiving the AI capability information reported by the UE indicating the AI capability of the UE comprises:

receiving the AI capability information reported by the UE indicating a hardware AI capability and a software AI capability of the UE, wherein the based on the AI capability information, allocating the AI service corresponding to the AI capability to the UE comprises:

allocating an AI service corresponding to the hardware AI capability and the software AI capability to the UE, wherein the software AI capability comprises a type of an AI application program interface currently possessed by the UE; and sending the software AI capability to the UE based on the hardware AI capability of the UE;

wherein the RRC signaling carrying the AI capability enquiry request comprises:

a UECapabilityEnquiry signaling, wherein the UECapabilityEnquiry signaling comprises a first information element (IE) and a second IE, wherein the first IE carries the AI capability enquiry request and the second IE carries a network capability enquiry request.

9. The information transmission method of claim 8, wherein receiving the AI capability information reported by the UE indicating the AI capability of the UE comprises:

wherein the hardware AI capability comprises:

a computing capability parameter of a processor of the UE;

wherein the computing capability parameter of the processor of the UE comprises at least one of:

a computing capability parameter of the processor of the UE for integers, or a computing capability parameter of the processor of the UE for floats.

10. The information transmission method of claim 9, wherein the computing capability parameter of the processor of the UE further comprises at least one of:

a computing rate; or, a ratio of the computing rate to power consumption;

wherein the computing rate comprises at least one of a maximum computing rate or a minimum computing rate supported by the processor of the UE.

11. The information transmission method of claim 9, wherein the software AI capability further comprises:

an on-device AI model currently possessed by the UE.

12. The information transmission method of claim 11, wherein receiving the AI capability information reported by the UE indicating the AI capability of the UE comprises:

receiving the AI capability information reported by the UE indicating an identifier of the on-device AI model; and based on the identifier, determining the on-device AI model supported by the UE.

13. The information transmission method of claim 8, wherein receiving the AI capability information reported by the UE indicating the AI capability of the UE comprises at least one of:

receiving overall AI capability information reported by the UE indicating an overall AI capability of the UE; or, receiving remaining AI capability information reported by the UE indicating a remaining AI capability of the UE.

14. The information transmission method of claim 8, wherein receiving the AI capability information reported by the UE indicating the AI capability of the UE comprises:

receiving a radio resource control (RRC) signaling carrying the AI capability information;

wherein the RRC signaling carrying the AI capability information comprises one of:

a UE-Evolved Universal Terrestrial Radio Access (EU-TRA)-Capability signaling; or a UE-New Radio (NR)-Capability signaling.

15. A base station, comprising a processor, a transceiver, a memory and an executable program stored in the memory and run by the processor, wherein the executable program when executed by the processor cause the processor to perform the information transmission method of claim 8.

16. A user equipment (UE), comprising a processor, a transceiver, a memory and an executable program stored in the memory and run by the processor, wherein the executable program when executed by the processor cause the processor to perform operations comprising:

in response to receiving a radio resource control (RRC) signaling carrying an artificial intelligence (AI) capability enquiry request, reporting AI capability information indicating an AI capability of the UE to a base station comprises:

reporting the AI capability information indicating a hardware AI capability and a software AI capability of the UE to the base station, wherein the hardware AI capability and the software AI capability are used by the base station to determine an AI service allocated to the UE, wherein the software AI capability comprises a type of an AI application program interface currently possessed by the UE; and receiving the software AI capability sent by the base station based on the hardware AI capability of the UE;

wherein the RRC signaling carrying the AI capability enquiry request comprises:

a UECapabilityEnquiry signaling, wherein the UECapabilityEnquiry signaling comprises a first information element (IE) and a second IE, wherein the first IE carries the AI capability enquiry request and the second IE carries a network capability enquiry request.

* * * * *